US009785578B2

(12) United States Patent
Brittain et al.

(10) Patent No.: US 9,785,578 B2
(45) Date of Patent: Oct. 10, 2017

(54) APPARATUS AND METHOD FOR CONTROLLING ACCESS TO A MEMORY DEVICE

(71) Applicant: ARM LIMITED, Cambridge (GB)

(72) Inventors: Mark Andrew Brittain, Austin, TX (US); Michael Andrew Campbell, Cambridge (GB)

(73) Assignee: ARM Limited, Cambridge (GB)

( * ) Notice: Subject to any disclaimer, the term of this patent is extended or adjusted under 35 U.S.C. 154(b) by 189 days.

(21) Appl. No.: 14/731,638

(22) Filed: Jun. 5, 2015

(65) Prior Publication Data

US 2016/0357688 A1 Dec. 8, 2016

(51) Int. Cl.
*G06F 12/14* (2006.01)
*G06F 13/16* (2006.01)
*G06F 13/18* (2006.01)

(52) U.S. Cl.
CPC ...... *G06F 12/1441* (2013.01); *G06F 13/1631* (2013.01); *G06F 13/18* (2013.01); *G06F 2212/1052* (2013.01)

(58) Field of Classification Search
CPC ............. G06F 12/1441; G06F 13/1642; G06F 13/1673; G06F 13/18; G06F 2212/1044
(Continued)

(56) References Cited

U.S. PATENT DOCUMENTS 6,591,349 B1    7/2003  Steinman et al.
6,622,225 B1 *  9/2003  Kessler ............... G06F 13/1642
                                                    711/105

(Continued)

FOREIGN PATENT DOCUMENTS

EP    1 895 423    3/2008

OTHER PUBLICATIONS

International Search Report and Written Opinion of the International Searching Authority mailed Aug. 1, 2016 in PCT/GB2016/051072, 10 pages.

*Primary Examiner* — Gary Portka
(74) *Attorney, Agent, or Firm* — Nixon & Vanderhye P.C.

(57) ABSTRACT

An apparatus and method are provided for controlling access to a memory device. The apparatus has a pending access requests storage that is used to store access requests waiting to be issued to the memory device, and memory access control circuitry is then used to issue to the memory device access requests selected from the pending access requests storage. Access requests are received at an interface of the apparatus from at least one requesting device, and access request evaluation circuitry within the apparatus is arranged to apply criteria to determine, for a current access request, whether to accept that current access request or reject that current access request. The criteria applied takes account of at least one access timing characteristic of the memory device. The access request evaluation circuitry is responsive to determining that the current access request is to be accepted, to cause that current access request to be stored in the pending access requests storage. However, if instead the access request is rejected, it is prevented from being added to the pending access requests storage at that time, and instead a rejection indication is issued to the requesting device that issued that current access request. This provides a mechanism for significantly improving the performance of the memory device by providing more selectivity as to what access requests are accepted into the pending access requests storage.

27 Claims, 9 Drawing Sheets

(58) Field of Classification Search
USPC .......................... 711/105, 150, 151, 152, 169
See application file for complete search history.

(56) References Cited

U.S. PATENT DOCUMENTS

2003/0088734 A1    5/2003  Cavallo et al.
2010/0332696 A1*  12/2010  Muppirala .......... G06F 13/1642
                                                710/39
2013/0117513 A1*   5/2013  Brittain ............... G06F 13/1626
                                                711/152

* cited by examiner

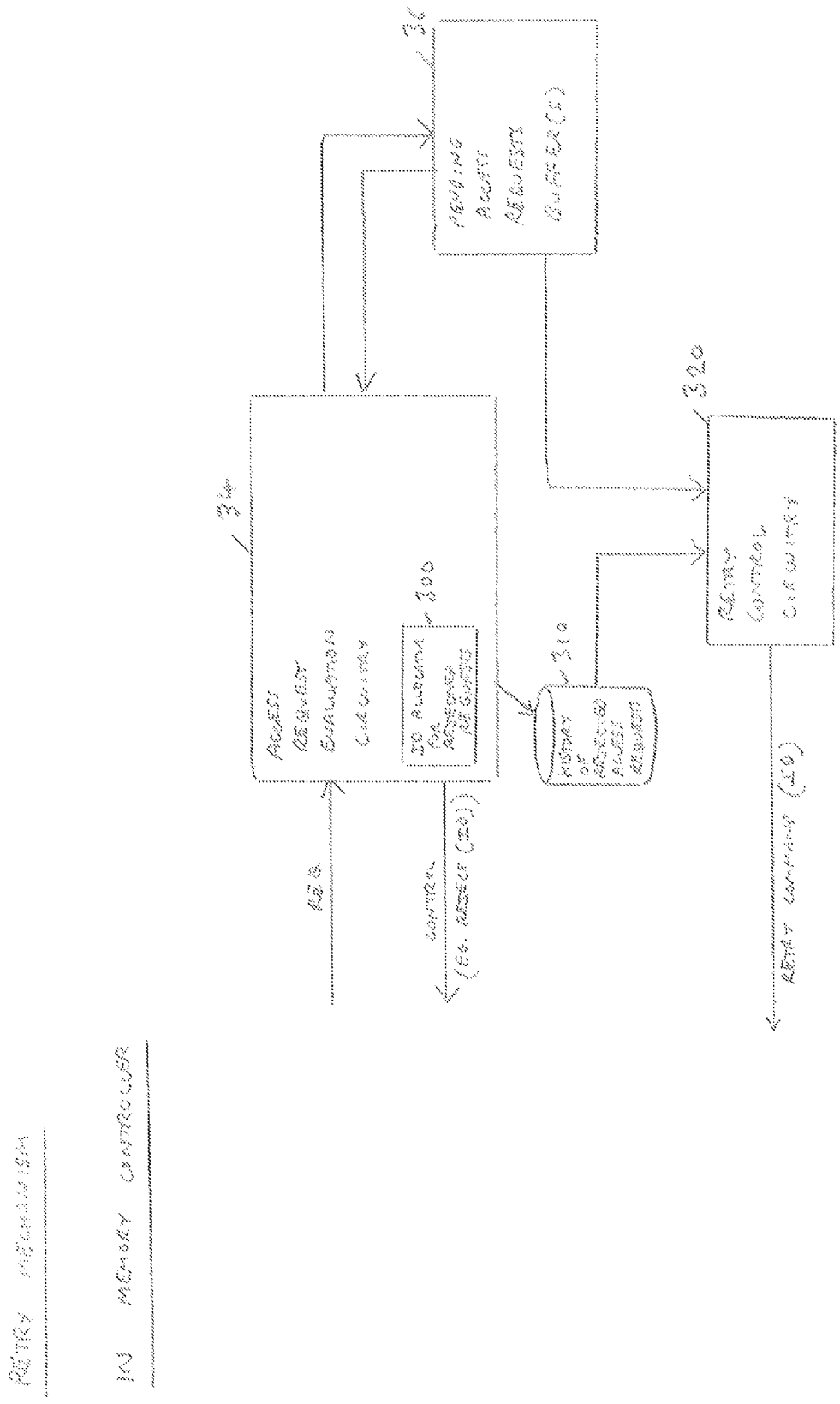

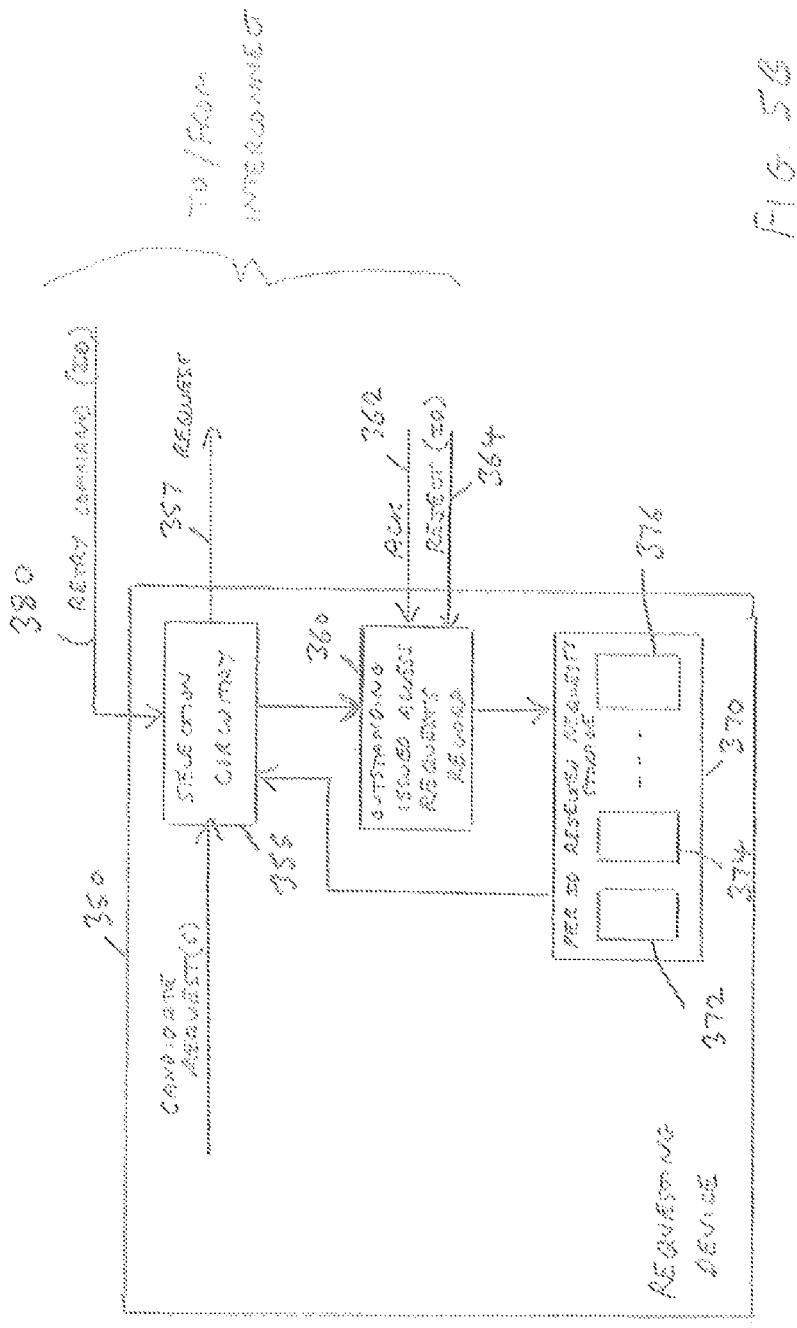

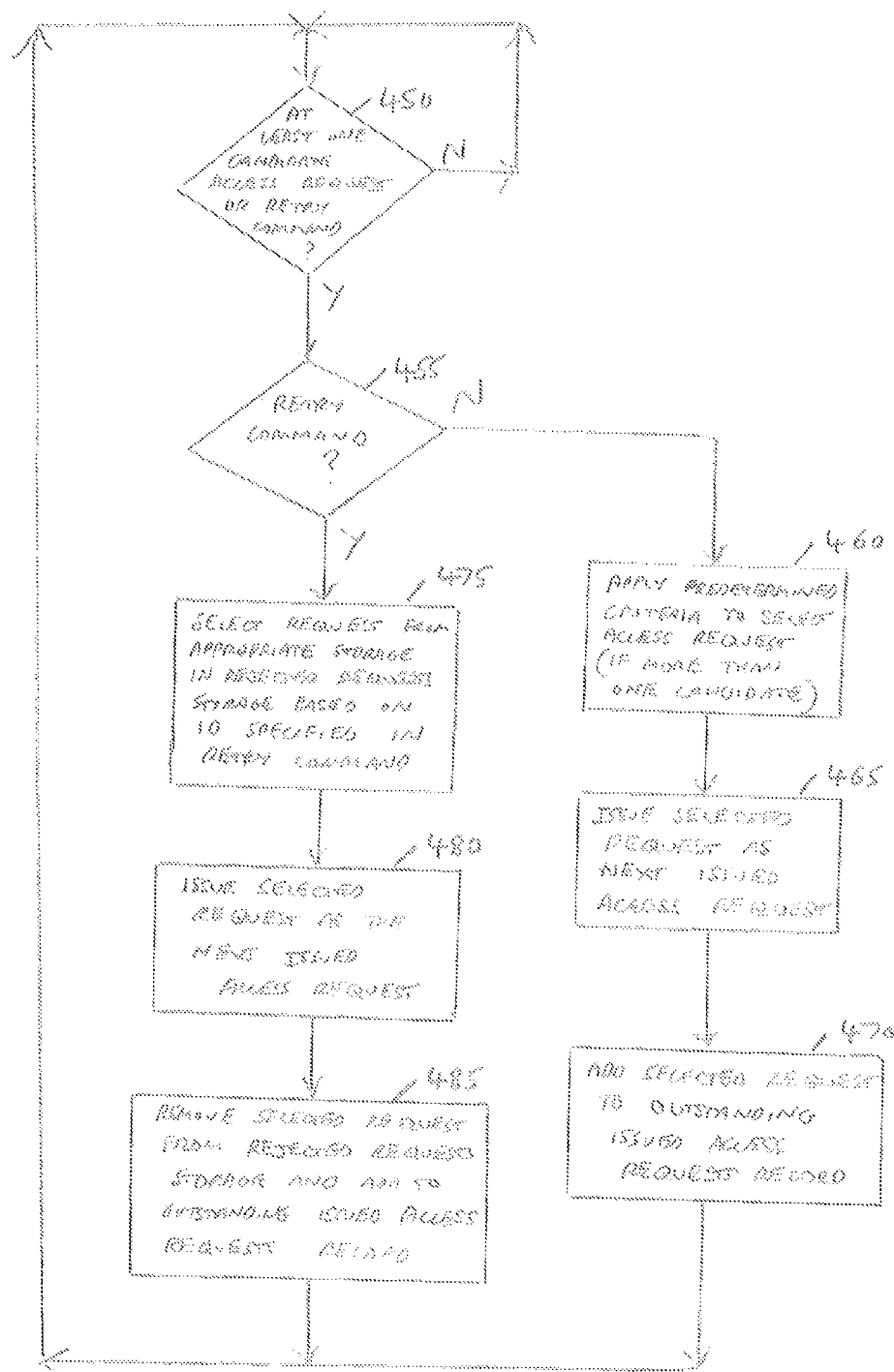

APPARATUS AND METHOD FOR CONTROLLING ACCESS TO A MEMORY DEVICE

BACKGROUND

The present technique relates to an apparatus and method for controlling access to a memory device.

Typically, a memory controller will be provided for a memory device, the memory controller being arranged to receive access requests from one or more requesting devices, and then to issue commands to the memory device to cause the accesses required by those access requests to be performed. The memory controller may be provided with a pending access requests storage in which access requests waiting to be issued to the memory device are temporarily stored. The memory controller can then seek to schedule the various access requests in the pending access requests storage so as to seek to optimise performance of the memory device.

In particular, many memory devices are arranged to consist of a plurality of sub-structures. The various sub-structures within the memory device will vary dependent on the type of memory device. As one particular example, considering a Dynamic Random Access Memory (DRAM) device, this is often organised into ranks, banks, rows and columns, and indeed at a higher hierarchical level there may be multiple channels. The access timing characteristics of the memory device may be such that there are certain access timing penalties associated with switching between the various sub-structures of the memory device, and accordingly the memory controller can try to re-order the access requests in the pending access requests storage so as to seek to reduce such timing penalties, and hence improve the overall memory performance.

However, within modern data processing systems, as the number of potential requesting devices communicating with the memory controller increases, the memory controller can become a performance bottleneck within the system. Further, whilst the memory controller can seek to re-order how the access requests within the pending access requests storage are performed, with the aim of improving performance, it only has the ability to re-order the access requests that are actually in the pending access requests storage, and the pending access requests storage has a finite size.

Accordingly, it would be desirable to provide a technique for increasing the efficiency of operation of a memory controller.

SUMMARY

In one example arrangement, there is provided an apparatus for controlling access to a memory device, comprising: a pending access requests storage to store access requests to be issued to the memory device; memory access control circuitry to issue to the memory device access requests selected from the pending access requests storage; an interface to receive access requests from at least one requesting device; and access request evaluation circuitry to apply criteria to determine, for a current access request received by said interface, whether to accept that current access request, the criteria taking account of at least one access timing characteristic of the memory device; the access request evaluation circuitry being responsive to determining that the current access request is to be accepted, to cause that current access request to be stored in the pending access requests storage.

In another example arrangement, there is provided a method of controlling access to a memory device, comprising: storing, in a pending access requests storage, access requests to be issued to the memory device; issuing to the memory device access requests selected from the pending access requests storage; receiving access requests from at least one requesting device; applying criteria to determine, for a current access request received, whether to accept that current access request, the criteria taking account of at least one access timing characteristic of the memory device; and responsive to determining that the current access request is to be accepted, storing that current access request in the pending access requests storage.

In a further example arrangement, there is provided an apparatus for controlling access to a memory device, comprising: pending access requests storage means for storing access requests to be issued to the memory device; memory access control means for issuing to the memory device access requests selected from the pending access requests storage means; interface means for receiving access requests from at least one requesting device; and access request evaluation means for applying criteria to determine, for a current access request received by said interface means, whether to accept that current access request, the criteria taking account of at least one access timing characteristic of the memory device; the access request evaluation means, responsive to determining that the current access request is to be accepted, for causing that current access request to be stored in the pending access requests storage means.

In a yet further example arrangement, there is provided an apparatus comprising: access request evaluation circuitry to apply criteria to determine, for a current access request received by an interface, whether to accept that current access request, the criteria taking account of at least one access timing characteristic of a memory device; the access request evaluation circuitry being responsive to determining that the current access request is to be accepted, to cause that current access request to be stored in a pending access requests storage.

BRIEF DESCRIPTION OF THE DRAWINGS

The present technique will be described further, by way of example only, with reference to embodiments thereof as illustrated in the accompanying drawings, in which:

FIG. 3 is a block diagram illustrating in more detail components provided within the access request evaluation circuitry of the memory controller of FIG. 1, in accordance with one embodiment;

FIG. 5A is a block diagram illustrating the operation of retry control circuitry that may be provided within the memory controller in accordance with one embodiment;

FIG. 5B illustrates components that may be provided within a requesting device in order to handle retry commands issued by the memory controller of FIG. 5A in accordance with one embodiment;

FIG. 7 is a flow diagram illustrating the operation of the requesting device of FIG. 5B in accordance with one embodiment.

DESCRIPTION OF EMBODIMENTS

Figure 1:
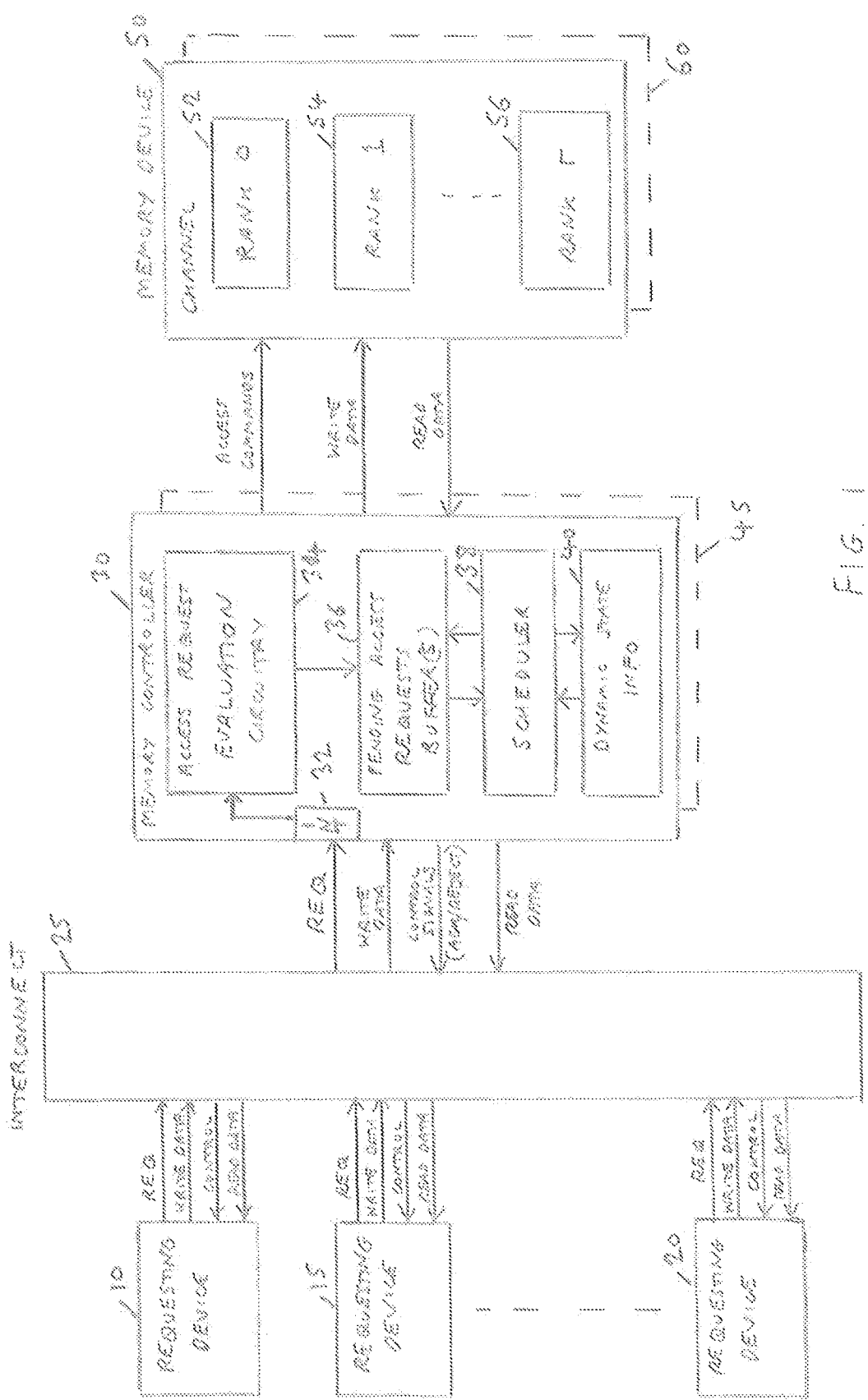
FIG. 1 is a block diagram of a data processing system in accordance with one embodiment.

Before discussing the embodiments with reference to the accompanying figures, the following description of embodiments is provided.

In accordance with one example embodiment, an apparatus is provided for controlling access to a memory device, where the apparatus has a pending access requests storage to store access requests to be issued to the memory device, and memory access control circuitry to issue to the memory device access requests selected from the pending access requests storage. The pending access requests storage can take a variety of forms, but in one embodiment may consist of one or more buffers in which access requests are temporarily stored whilst they are awaiting issuance to the memory device. In one particular embodiment, there may be a separate buffer for write access requests and a separate buffer for read access requests. The memory access control circuitry can also take a variety of forms, but in one embodiment takes the form of a scheduler that is arranged to review the contents of the pending access requests storage, and to determine an appropriate order in which to issue those access requests to the memory device.

The apparatus is arranged to receive access requests from at least one requesting device, those access requests being presented at an interface of the apparatus. Access request evaluation circuitry is then arranged to apply criteria to determine, for a current access request received from one such requesting device, whether to accept that current access request or to reject that current access request. The criteria applied when making this determination takes into account at least one access timing characteristic of the memory device. If it is determined that the current access request is to be accepted, then the current access request is stored in the pending access requests storage. The criteria applied can take a variety of forms, but in one embodiment takes the form of predetermined criteria.

By virtue of such a technique, the received access requests are not automatically added to the pending access requests storage, but instead an evaluation of a received access request is performed before deciding whether to allow that access request to be added to the pending access requests storage. This enables an improvement in the mix of access requests present in the pending access requests storage, which are then available to the memory access control circuitry when the memory access control circuitry is deciding which access requests to select for issuance to the memory device. Such an approach can hence give rise to an improvement in the performance of the memory device by increasing the likelihood that certain access timing penalties can be avoided, due to the memory access control circuitry having access to pending access requests in the pending access requests storage, at least some of which have themselves been subjected to an evaluation taking account of at least one access timing characteristic of the memory device before being allowed to be added to the pending access requests storage.

Such an approach can be applied in a variety of situations, but in one embodiment is particularly well suited to situations where the apparatus that is controlling access to the memory device is a potential performance bottleneck within the system, as for example may arise where the available access requests to be presented to the interface from the at least one requesting device exceed the number of access requests that can be accepted into the pending access requests storage at any particular point in time.

In one embodiment the access request evaluation circuitry is responsive to determining from application of the criteria that the current access request is to be rejected instead of accepted, to prevent that current access request being added to the pending access requests storage and to cause a rejection indication to be issued to the requesting device that issued that current access request. The rejection indication can take a variety of forms, and the requesting device may respond to the rejection indication in a variety of ways. For example, it may in one embodiment keep a record of the fact that the access request has been rejected, and then at some future point in time seek to reissue that access request. This could for example be done following the lapse of a predetermined time period, or in an alternative embodiment the memory controller may be arranged to issue a retry request to the requesting device at some later point, in order to cause that rejected access request to be reissued.

There are a number of ways in which the criteria can be applied by the access request evaluation circuitry so as to take account of at lest one access timing characteristic of the memory device. In one embodiment, the access request evaluation circuitry is arranged to compare at least one attribute of the current access request with at least one attribute of access requests in the pending access requests storage when applying the criteria to take account of said at least one access timing characteristic of the memory device. Hence, having regard to the current contents of the pending access requests storage, the access request evaluation circuitry can be arranged to determine whether the addition of the current access request to the pending access requests storage is likely to be beneficial having regard to the at least one access timing characteristic, or not, and then decide whether to accept or reject that current access request dependent on that evaluation.

The at least one attribute of the current access request that is compared with at least one attribute of access requests in the pending access requests storage can take a variety of forms. However, in one embodiment, the memory device comprises a plurality of regions, and said at least one attribute comprises a region attribute identifying a region of the memory device to be accessed by the access request. The regions can take a variety of forms, but in one embodiment may be equated with at least some of the sub-structures of the memory device referred to earlier. Hence, considering the particular example of a DRAM memory, the regions may for example be associated with one or more of the ranks, banks, and/or rows of the memory device.

The at least one access timing characteristic that is taken into account by the access request evaluation circuitry when applying the criteria in order to decide whether to accept or reject a current access request can take a variety of forms. However, in one embodiment the at least one access timing characteristic of the memory device comprises a data access timing penalty incurred when the memory access control circuitry issues access requests to the memory device that identify different regions. Thus, when deciding whether to allow a current access request to be accepted, and hence stored within the pending access requests storage, the access request evaluation circuitry can seek to take account of the likelihood that adding that access request to the pending access requests storage could give rise to such a data access timing penalty.

More particularly, in one embodiment, the access request evaluation circuitry is arranged to determine that the current access request is to be rejected when it is determined that the addition of the current access request to the pending access requests storage could give rise to said data access timing penalty being incurred when that current access request is subsequently issued to the memory device, having regard to the access requests already stored in the pending access requests storage.

In one example embodiment, the plurality of regions comprise a plurality of ranks. In such an example, data access timing penalties may occur when seeking to issue consecutive access requests to different ranks. For example, in one embodiment the data access timing penalty is incurred when the memory access control circuitry issues consecutive write access requests to different ranks within the memory device. In addition, in one embodiment a similar data access timing penalty may be incurred when the memory access control circuitry issues consecutive read access requests to different ranks within the memory device.

In an alternative embodiment, or in addition, the plurality of regions may comprise a plurality of rows within a bank of the memory device, and the data access timing penalty is incurred when the memory access control circuitry issues access requests to different rows within the same bank of the memory device. Hence, in such an embodiment, it may be decided that if the current access request is seeking to access the same row within the same bank as at least one pending access request already in the pending access requests storage, then it may be appropriate to accept that current access request, whereas if it is seeking to access a different row within the same bank as needs to be accessed by a pending access request already in the pending access requests storage, it may be determined that the current access request should be rejected.

Whilst the access timing characteristic of the memory device may comprise a data access timing penalty incurred when issuing access requests to the memory device that identify different regions, in other embodiments the access timing characteristic can take a different form. For example, in one embodiment the at least one access timing characteristic of the memory device may comprise an access time period associated with a particular type of access request already stored in the pending access requests storage.

By way of example, in one embodiment, the access request evaluation circuitry may be arranged to determine that the current access request is to be rejected when it is determined that the current access request is seeking to access a region that is the same as the region to be accessed by said particular type of access request already stored in the pending access requests storage.

The particular type of access request may take a variety of forms, but in one embodiment takes the form of a type of access request that takes a relatively long time to perform within the memory device. A particular example would be a refresh, or a self-refresh, type of access request. Given that such a type of access request may take a long time to perform, it may be beneficial to prevent the pending access requests storage from continuing to receive access requests that are directed to the same region as that particular type of access request, since it may be a significant period of time before such access requests could be issued to the memory device.

In one embodiment, the particular type of access request will be considered to be already stored in the pending access requests storage if it has not yet been issued to the memory device, or if it has been issued to the memory device but the memory device has not yet completed processing of that access request. Hence, in such embodiments, the current access request may be rejected when the particular type of access request has been issued by the memory access control circuitry of the memory device, but the memory device has not yet completed processing of that access request.

In one embodiment, the above described operations of the access request evaluation circuitry may be performed in respect of every access request received at the interface. However, in an alternative embodiment, the apparatus further comprises control storage to store control data used to determine whether the access request evaluation circuitry is enabled for the current access request, when the access request evaluation circuitry is disabled the current access request being accepted and stored within the pending access requests storage. Hence, the functionality of the access request evaluation circuitry can be turned on and off as desired, having regard to the control data stored in the control storage. This hence allows the operation of the access request evaluation circuitry to be enabled selectively, for example in situations where it is determined that there is a high demand on the apparatus such that the apparatus is becoming a performance bottleneck. In such a situation, the apparatus will potentially be presented with more access requests than it is able to accept, and hence the use of the access request evaluation circuitry can allow the apparatus to be more selective about which access requests it accepts for storing in the pending access requests storage, with the aim of seeking to improve the performance of the memory device, by issuing access requests in an order which reduces the access timing penalties that might otherwise arise.

The control data can take a variety of forms, but in one embodiment the control data identifies at least a fullness threshold of the pending access requests storage, and the access request evaluation circuitry is disabled for the current access request if the number of access requests already stored in the pending access requests storage does not exceed said fullness threshold. In periods of time where the apparatus is receiving more access requests from the at least one requesting device than it can process, it is expected that the pending access requests storage will become relatively full, and accordingly when the predetermined fullness threshold is exceeded, this will indicate a situation where it is appropriate to turn on the access request evaluation circuitry so as to be more selective about the access requests that are accepted into the pending access requests storage. Conversely, in periods where there is a reduction in the access requests being issued to the apparatus from the at least one requesting device, it is expected that the number of pending access requests in the pending access requests storage will reduce such that the number of pending access requests drops below the fullness threshold, at which point the operation of the access request evaluation circuitry can be disabled. Once disabled, then any access requests presented at the interface will be added into the pending access requests storage, and can then be considered by the memory access control circuitry when deciding the order in which the access requests should be issued to the memory device.

Whilst the control data may include a fullness threshold, it can additionally include other criteria that needs to be evaluated when determining whether the access request evaluation circuitry is to be enabled for the current access request. As a particular example, each access request may be accompanied by some sideband information identifying attributes associated with the access request, one such example being a quality of service (QoS) attribute. If an access request has a particularly high QoS value, then it may be appropriate to disable the access request evaluation circuitry even if the fullness threshold is being exceeded, as this would then ensure that that high QoS value access request is accepted into the pending access requests storage, even if it might otherwise have been rejected had the access request evaluation circuitry applied the criteria in respect of that access request.

There are a number of ways in which rejected access requests can be caused to be reperformed. In one embodiment, each of the requesting devices may be arranged to periodically retry rejected access requests. However, alternatively, or in addition, the memory controller apparatus can itself be provided with functionality to trigger such rejected access requests to be retried. In particular, in one embodiment the apparatus further comprises retry control circuitry to apply retry criteria to determine whether to issue to a requesting device a retry request, in order to cause said requesting device to re-issue to the apparatus an access request that has previously been rejected, the retry criteria taking account of at least one access timing characteristic of the memory device. Hence, in this embodiment the apparatus proactively seeks to determine situations where it would be appropriate for a rejected access request to be retried.

In one embodiment, the retry control circuitry is arranged to analyse at least one attribute of access requests in the pending access requests storage when applying the retry criteria to take account of said at least one access timing characteristic of the memory device. Hence, purely by way of example, the retry control circuitry may consider the memory regions to be accessed by the access requests in the pending access requests storage, and based on that analysis may determine that it would be desirable to receive one or more additional access requests directed to a particular memory region. If it is known that a previously rejected access request was directed to such a memory region, then the retry control circuitry can cause a retry request to be issued to the relevant requesting device, to cause that previously rejected access request to be retried. The expectation is that that retried access request will then meet the criteria for it to be accepted and added to the pending access requests storage.

In one embodiment, to assist in this process, the apparatus further comprises a rejected access requests storage to maintain predetermined information about access requests that have previously been rejected, said predetermined information comprising at least the attribute(s) that is/are analysed by the retry control circuitry for the access requests in the pending access requests storage. Hence, with regard to the particular example mentioned above, such a rejected access requests storage could maintain information about the regions associated with access requests that have previously been rejected.

Thus, in one example embodiment, the retry control circuitry is arranged to determine, from the analysis of said at least one attribute of access requests in the pending access requests storage, a value of said at least one attribute desired for a re-issued access request, and is arranged to reference the rejected access requests storage to determine whether the access requests that have been previously rejected include an access request having that value for said at least one attribute. If so, then a retry request can be issued for such an access request.

The retry request can take a variety of forms, but in one embodiment includes an identifier field identifying at least one attribute required for the access request to be reissued. Hence, again considering the earlier mentioned example where the attribute is a memory region, the retry request can specify the memory region associated with an access request that it wishes to have reissued.

When the relevant requesting device hence receives such a retry request, it can identify one of its previously rejected access requests that is seeking to access such a memory region, and cause that access request to be retried.

There are a number of ways in which the requesting device(s) can keep a record of the rejected access requests so as to assist in identifying appropriate access requests to retry in response to a particular retry request. In one example embodiment, the rejection indication issued by the access request evaluation circuitry when an access request is rejected also includes said identifier field, allowing said at least one requesting device to maintain a record of its access requests that have been rejected, sorted by said at least one attribute. Hence, in such embodiments, the requesting device can sort the rejected access requests by the attribute specified in the rejection indication, and hence using the earlier example may maintain separate records of the rejected access requests sorted by the memory region seeking to be accessed. When a retry request then specifies a particular memory region, the requesting device can reference the appropriate record associated with that memory region in order to select a suitable access request to be retried.

In one embodiment, the retry request may be targeted at a particular selected requesting device. For example, in one embodiment the earlier mentioned rejected access requests storage may maintain, as part of the predetermined information about access requests that have previously been rejected, an indication of which requesting device issued each such access request. This then enables the retry control circuitry to issue a retry request to a particular requesting device.

However, in an alternative embodiment, the memory controller apparatus may not retain such information, and may merely broadcast each retry request to the requesting devices within the system.

As with the earlier mentioned access request evaluation circuitry, the retry control circuitry may be permanently enabled, or may be selectively enabled and disabled based on certain control data. For example, in one embodiment the apparatus may further comprise retry control storage to store retry control data used to determine when the retry control circuitry is enabled and when the retry control circuitry is disabled.

The control data can take a variety of forms, but in one embodiment the retry control data identifies at least a fullness threshold of the pending access requests storage, and the retry control circuitry is disabled if the number of access requests already stored in the pending access requests storage exceeds said fullness threshold. Hence, when the pending access requests storage is relatively full, in such embodiments the retry control circuitry may not to be used. Instead, in this embodiment the retry mechanism would only be initiated when the pending access requests storage was relatively empty (below the fullness threshold). In an alternative embodiment, the retry control circuitry is always enabled, in order to seek to determine the best time to retry each rejected request.

In one embodiment, there is provided a requesting device for communicating with an apparatus for controlling access to a memory device as discussed in the above embodiments, the requesting device comprising a rejected requests storage comprising a plurality of storage portions, each storage portion associated with at least one attribute specifiable in said identifier field. The requesting device further comprises control circuitry to store an indication of a rejected access request within the storage portion associated with the at least one attribute specified in the identifier field of the rejection indication, the control circuitry being further responsive to a retry request determine the at least one attribute specified in the identifier field of the retry request and to determine from the associated storage portion a rejected access request to reissue. This provides an efficient mechanism for the requesting device to sort any rejected access requests by said at last one attribute, and hence enables an efficient mechanism for determining an access request to retry in response to a retry request.

Particular embodiments will now be described with reference to the Figures.

FIG. 1 is a block diagram of a data processing system in accordance with one embodiment. As shown, a number of requesting devices 10, 15, 20 are arranged to issue access requests in respect of data held in a memory device 50. The requesting devices can take a variety of forms, and hence for example may comprise a central processing unit (CPU), a graphics processing unit (GPU), a cache, etc. The memory device 50 has a memory controller 30 associated therewith that is arranged to receive the various access requests from the requesting devices 10, 15, 20, and to then schedule those access requests for processing within the memory device 50. There are a number of ways in which the requesting devices 10, 15, 20 may be coupled with the memory controller 30, but in the arrangement shown in FIG. 1 it is assumed that there is an intervening interconnect structure 25 via which the requesting devices communicate with the memory controller 30.

The memory device 50 is arranged as a plurality of sub-structures, with the actual sub-structures being dependent on the type of memory device. In one example embodiment where the memory device is a DRAM memory device, the memory devices is organised into a hierarchy of ranks, banks, rows and columns, representing a variety of different sub-structures within the memory device. The access timing characteristics of the memory device may be such that there are certain access timing penalties associated with switching between the various sub-structures of the memory device, and accordingly it is desirable for the memory controller 30 to seek to take account of such access timing characteristics when scheduling access requests for performance by the memory device 50.

As shown in FIG. 1, the various requests from the requesting devices 10, 15, 20 are presented to an interface 32 of the memory controller 30. In accordance with the embodiment shown in FIG. 1, access request evaluation circuitry 34 is provided, which in one embodiment can be selectively enabled and disabled, and when enabled performs some initial evaluation of a current access request, in order to decide whether it should be accepted or rejected. If it is accepted, it is added to the pending access request buffer(s) 36, whereas if it is rejected it is not added to the pending access requests buffer(s) 36, but instead a rejection indication control signal is returned to the relevant requesting device indicating that the access request that that requesting device has issued has been rejected.

Typically the address specified in an access request will be decoded prior to the access request being added to the pending access requests buffer(s) 36 in order to identify the relevant sub-structures within the memory device that require accessing, for example the rank, bank, row and column information in the earlier example of a DRAM memory. Such decoding can be performed within the access request evaluation circuitry 34. When the access request evaluation circuitry is disabled, such decoding will still be performed, but any received access request at the interface will be automatically added to the pending access requests buffer(s) 36 once decoded.

In practice, there may be multiple buffers within the pending access requests buffer(s) 36, for example there may be a buffer for read accesses and a different buffer for write accesses.

As shown in FIG. 1, the memory controller 30 may also maintain dynamic state information 40 about the memory device, for example keeping a record of which particular sub-structures within the memory device are currently active (for example which row within each back is currently activated), along with potentially other information such as the power state of the various sub-structures. Based on this information and the identification of the pending access requests in the buffers 36, the scheduler 38 then seeks to schedule the various pending access requests so as to optimise the performance of the memory device. For instance, when a particular row has been activated within a bank, it is beneficial to perform any other accesses required to that row prior to the row being deactivated, and another row being activated. Hence, the scheduler 38 can review the contents of the buffers 36 in order to seek to reorder the pending access requests as necessary so as to allow any remaining accesses to an activated row within a bank to be performed before that row is deactivated.

There are also other situations where access timing penalties may arise, for example where consecutive write access requests are issued to different ranks within the memory device. A similar access timing penalty can be associated with consecutive read access requests to different ranks within the memory device. Again, the scheduler 38 may be able to reschedule the requests within the buffers 36 so as to reduce the instances of such timing penalties, for example by ensuring that multiple writes to the same rank are performed prior to a write access to a different rank.

As the scheduler decides on the order in which the pending access requests should be processed, it then issues appropriate access commands to the memory device 50 in order to perform the required access operations, so as to cause the write data of pending write access requests to be written into the memory device, and the read data required by pending read access requests to be returned from the memory device. Whilst not explicitly shown in FIG. 1, the memory controller 30 will typically have a buffer for buffering the write data of pending write access requests, and may also potentially buffer read data prior to that read data being returned via the interconnect 25 to the relevant requesting device 10, 15, 20.

Whilst in one embodiment a single memory controller 30 may control the entire memory device, in some embodiments the memory device is partitioned into multiple parts, with each part having an associated separate memory controller. Considering the earlier mentioned example of DRAM, the memory device may be partitioned into multiple channels 50, 60, with each channel having a separate memory controller 30, 45. The other memory controller 45 will be constructed in a similar fashion, and function in a similar way, to that described in relation to the memory controller 30.

From the above discussion of the memory controller, it will be appreciated that the scheduler 38 within the memory controller seeks to optimise the accesses having regard to certain access timing characteristics of the memory device, in order to seek to reduce the time overhead associated with performing the various memory accesses. As will be apparent from the above discussions, these decisions are usually based on a review of information about the current state of the memory device (the dynamic state information 40) and the access requests currently residing in the memory controller's buffers 36.

However, in modern data processing systems where the number of requesting devices is increasing, situations can arise where the memory controller becomes a performance bottleneck within the system, for example due to it being presented with more access requests than it can currently receive into the pending access requests buffers 36. The pending access requests buffers 36 have a finite size, and the scheduler 38 can only perform its reordering functionality based on the current contents of the buffers 36. Accordingly, in periods of such high demand, the decisions made by the scheduler 38 may be sub-optimal, since the current contents of the buffers 36 may not in fact represent the best mix of access requests that the scheduler could select from. As will be discussed in more detail later with reference to the later figures, it is during such periods that the access request evaluation circuitry 34 is in one embodiment enabled, to cause an evaluation process to be performed in order to be selective as to which access requests are accepted for forwarding to the buffers 36, with the aim of seeking to provide the scheduler with an improved mix of requests from which to select. In contrast, in periods where the memory controller is not considered to be a performance bottleneck, then in one embodiment the operation of the access request evaluation circuitry can be disabled, to effectively allow the memory controller to operate in a standard manner where all received access requests are decoded and placed in the pending access requests buffers 36. Before discussing the operation of the access request evaluation circuitry 34 in more detail, a discussion of the various sub-structures within the memory device 50 will be discussed further with reference to FIGS. 2A and 2B, for the particular example of a DRAM memory.

Figure 2A:
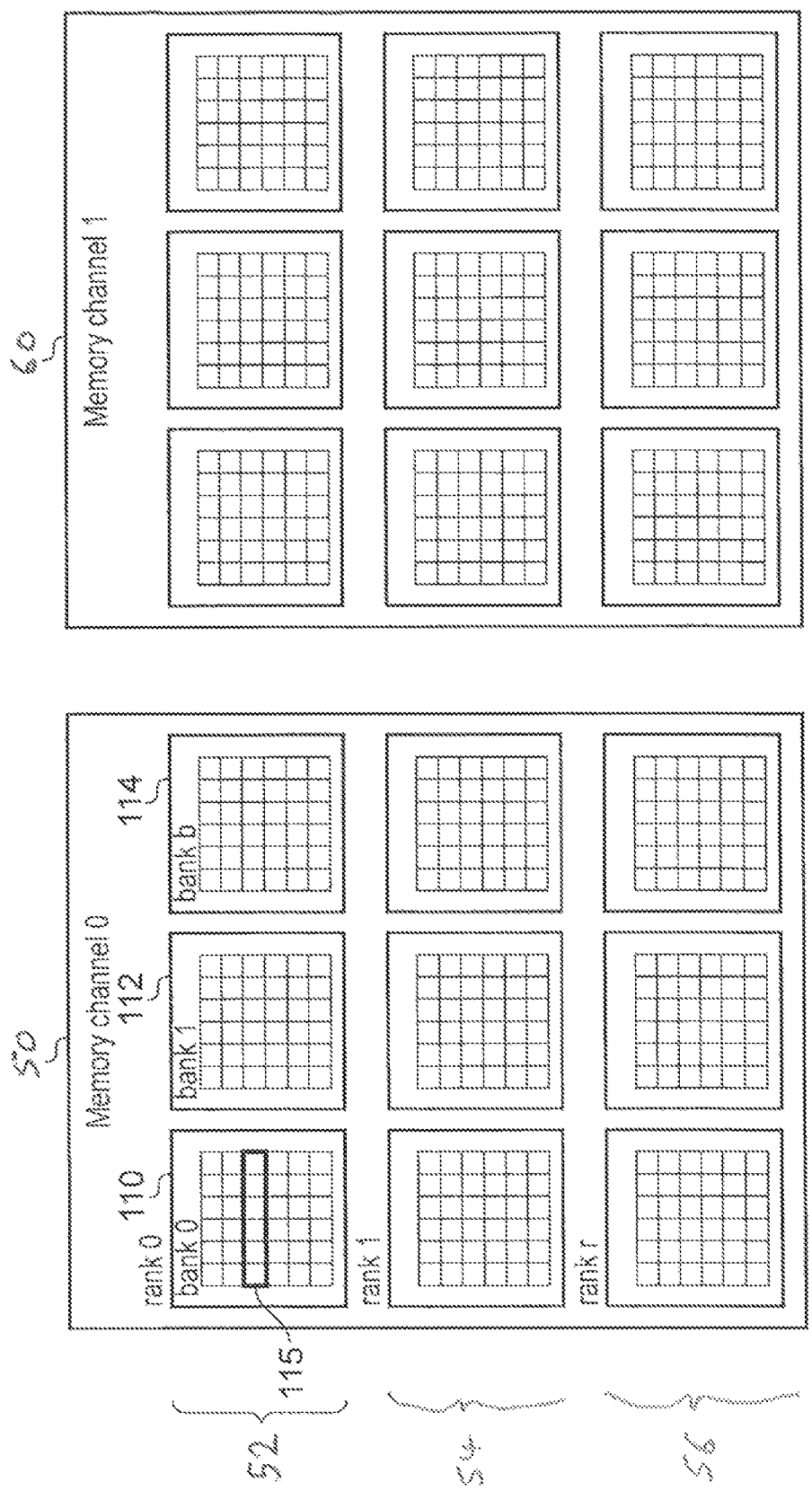
FIGS. 2A and 2B illustrate the arrangement of a memory device that may be used within the system of FIG. 1 in accordance with one embodiment.

FIG. 2A illustrates a particular example of a DRAM memory, a DRAM being typically organised into channels, ranks, banks, rows and columns (there can also be other groupings such as bank groups and logical ranks), with the performance of the memory device greatly depending on the access patterns (i.e. how the scheduler schedules the various pending access requests) and the address mapping (i.e. how the specified memory addresses are decoded into physical locations within the memory device). In the example of FIG. 2A, the DRAM memory is considered to consist of two memory channels 50, 60, with each memory channel having a plurality of ranks 52, 54, 56, and with each rank consisting of a plurality of banks 110, 112, 114. Within each bank, the memory is organised into rows, one such row being indicated by the box 115, each row having multiple columns.

When accessing a specific column, the memory controller first has to prepare the row within the relevant bank, perform a read or write operation to the appropriate column, and then close the row. Due to the time taken to prepare the row and subsequently close the row, it is beneficial if multiple read/write operations are performed. within the row whilst it is open. Rows in different banks can be accessed in parallel.

The memory controller may seek to increase the number of column accesses within a particular row of a particular bank, by reordering the access requests within the buffers 36 so as to aim to process any accesses to a particular row of a particular bank whilst that row is open. If there are no such accesses, the controller may target different banks, avoiding rows in the same rank/bank causing conflicts.

The memory controller can also take account of various other access timing characteristics of the memory device, which could influence performance. For example, if a write access to a particular rank is followed by another write access to a different rank, this may give rise to a write-to-write penalty arising on the write data bus, hence performance may be improved by seeking to perform any pending write access requests to the same rank before processing a write access request to a different rank. A similar penalty, referred to herein as a read-to-read penalty, may also arise in connection with consecutive read accesses to different ranks, and hence it can be beneficial to reorder read requests to seek to alleviate such time penalties.

Such reordering decisions can be taken by the scheduler 38 within the memory controller 30, due to its detailed knowledge of the structural arrangement of the memory device, and of the dynamic state of the memory device (e.g. which rows are currently open, etc). However, the extent to which the memory controller can optimise the accesses is limited by the number of pending accesses within the buffers 36, and by necessity the buffers will have a finite size.

Figure 2B:
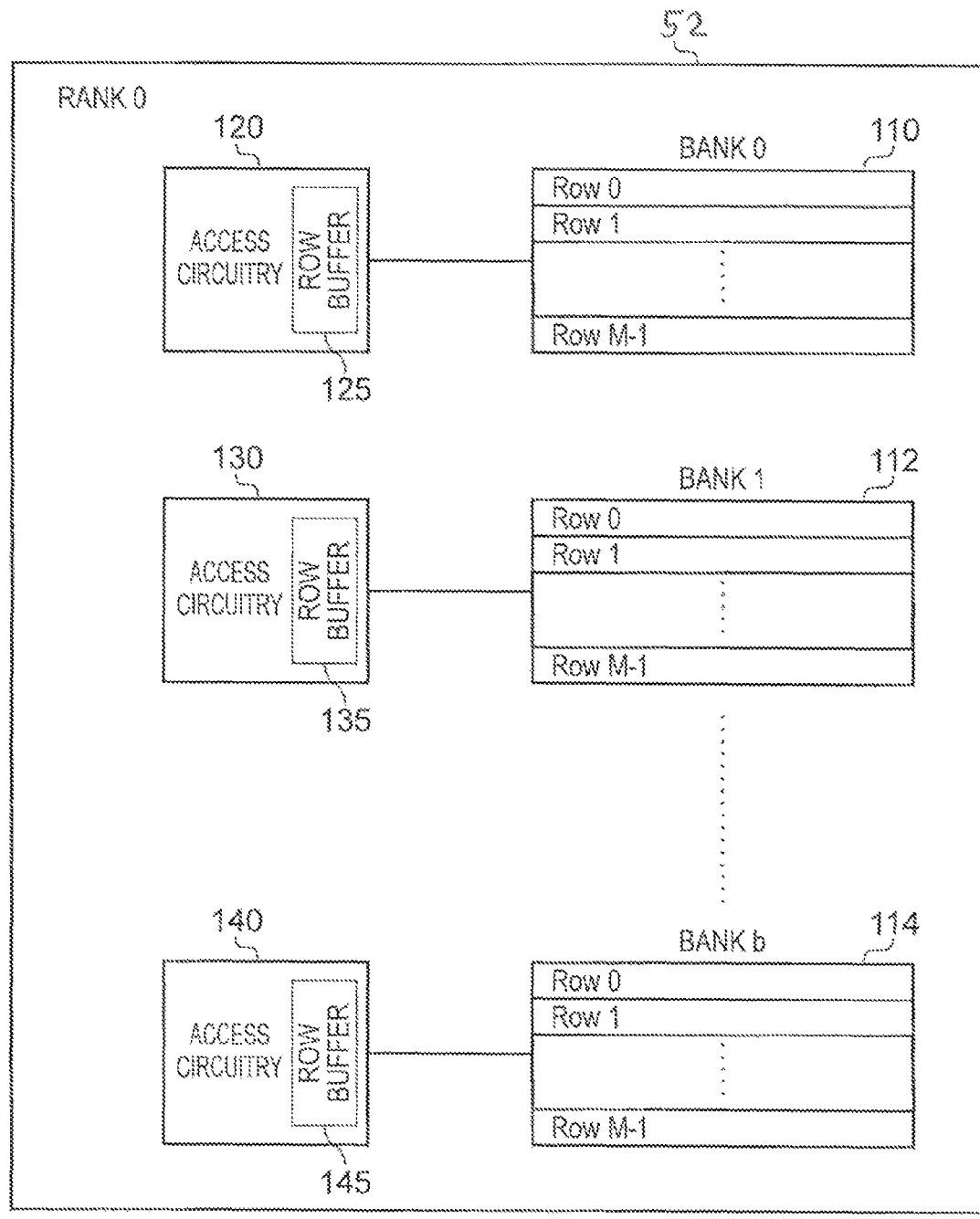
Figure 2:
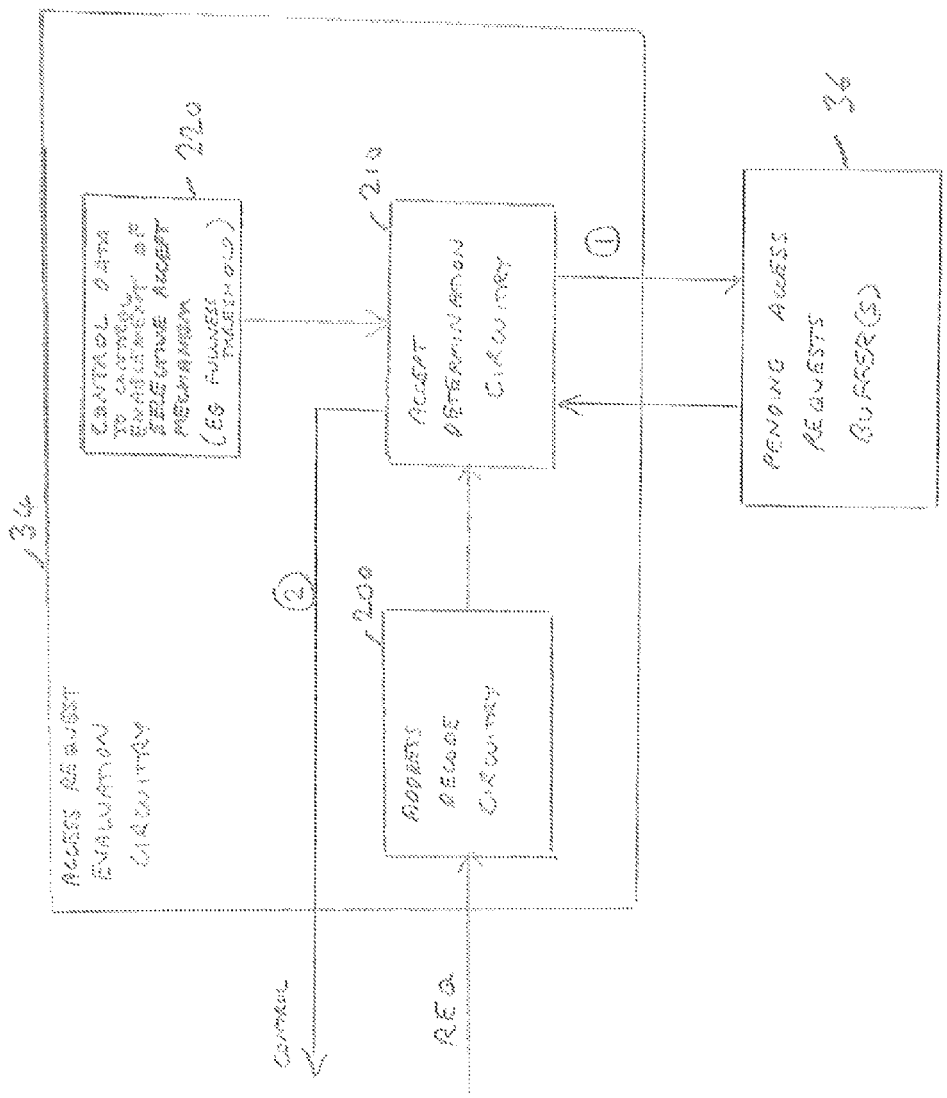

FIG. 2B is a diagram illustrating access circuitry provided in association with each bank within one of the ranks of the DRAM memory shown in FIG. 2A, in accordance with one embodiment. In particular, FIG. 2B illustrates the example of the rank 52. In it envisaged that each rank will be constructed similarly to that shown in FIG. 2B.

As shown in FIG. 2B, for each bank 110, 112, 114, there is associated access circuitry 120, 130, 140 which is responsive to scheduling control commands from the scheduler 38 of the memory controller 30. Each access circuitry 120, 130, 140 includes a row buffer 125, 135, 145, respectively, for storing at least one row of data from the associated bank. In order to access a data value in a row, that row first has to be moved into the relevant row buffer via a RAS command issued from the memory controller, such a RAS command also being referred to herein as an activate command. Once the row has been stored in the row buffer, then individual memory addresses within that row can be accessed via CAS commands issued from the memory controller. Ultimately, when accesses to the row have been completed, or when a new row needs to be accessed, a precharge command is issued from the memory controller to cause the current contents of the row within the row buffer to be stored back into the associated bank within the DRAM.

It will hence be appreciated that there is a significant access time penalty, and indeed a power consumption penalty, incurred when activating a row so that its contents can subsequently be accessed, and accordingly it is beneficial, once a row has been activated and accordingly its contents have been stored within the row buffer, for a plurality of accesses to the memory addresses of that row to then be performed before the row's contents are then subsequently returned to the bank.

More generally, from the above discussions it will be appreciated that a memory device such as a DRAM memory has non-uniform access timing characteristics, resulting from the way in which the various sub-structures of the memory device are accessed in order to process the accesses required by the pending access requests. The memory controller, and in particular the scheduler 38, seeks to reduce the timing penalty associated with such timing characteristics by seeking to reorder pending access requests where appropriate, but the effectiveness of that approach is limited by the sample of access request in the buffers 36.

FIG. 3 is a block diagram illustrating in more detail components provided within the access request evaluation circuitry 34. An incoming access request from the interface 32 is decoded in the address decode circuitry 200 in order to determine the relevant substructures within the memory device that require accessing, for example the rank, bank, row and column using the earlier DRAM example. The decoded request is then passed to accept determination circuitry 210 for further evaluation.

A storage element containing control data 220 is provided that is used to control enablement of the selective accept mechanism implemented by the accept determination circuitry. As mentioned earlier, in one embodiment the access request evaluation circuitry is enabled when the memory controller is becoming a performance bottleneck, and in such a situation it will typically be the case that the buffers 36 are relatively full. Accordingly, a fullness threshold can be specified within the control data 220 to identify a relative level of fullness of the buffers 36, above which the operation of the access request evaluation circuitry is enabled. Hence, the accept determination circuitry 210 can reference the control data, and also reference the state of the current buffers 36 in order to determine whether the access request evaluation circuitry should be enabled for the current access request or not. If this determination indicates that the level of fullness of the buffers is exceeding the fullness threshold, then the access request evaluation circuitry is enabled, and the access determination circuitry 210 performs some additional steps to determine whether to accept or reject the access request. Conversely, if the fullness threshold is not exceeded, then no further steps are required by the access determination circuitry, the access request evaluation circuitry is effectively considered to be disabled, and the decoded address information from the address decode circuitry 200 is routed directly into the pending access requests buffer(s) 36.

Assuming that, with reference to the control data 220, the accept determination circuitry 210 determines that the access request evaluation circuitry is enabled for the current access request, then the access determination circuitry is arranged to compare at least one attribute of the current access request with a corresponding attribute of the pending access requests already stored in the buffers 36, the relevant attribute or attributes being chosen so as to enable the accept determination circuitry to apply acceptance criteria that takes into account at least one access timing characteristic of the memory device.

As one particular example, the access determination circuitry may consider the rank to be accessed by the current access request (that information being part of the decoded information provided by the address decode circuitry 200), and also consider the ranks to be accessed by the pending access requests in the relevant buffers 36. For example, if the current access request is a write access request, the access determination circuitry 210 may look at the currently pending write access requests in the write buffer in order to determine the ranks that are to be accessed by those write requests. In one example embodiment, if the current access request is seeking to write to rank X, and none of the pending write access requests in the buffers 36 are seeking to access that rank, then the accept determination circuitry may determine it appropriate to reject that access request. In such a scenario, the current access request will not be added to the buffers 36, and instead a reject signal will be issued as a control signal via the interconnect 25 to the relevant requesting device, to identify that the access request has been rejected.

As will be discussed in more detail later, in some embodiments the reject signal may be accompanied by certain additional information, in one embodiment that additional information including an identifier of the rank being accessed, thereby enabling the requesting device to sort any of its rejected access requests by rank. More generally, the identifier information provided with a rejected access request can take any desired form, allowing the requesting device to sort its rejected access requests by the information held in that identifier field. Such an approach can be of assistance when seeking to retry rejected access requests, in particular when adopting the embodiment to be discussed later with reference to FIG. 5A.

Returning to the specific example mentioned above where the current write access request is seeking to perform a write access to rank X, if there is already a pending write access request to rank X contained within the buffers 36, then the accept determination circuitry 210 may be arranged to accept that access request, even though the fullness threshold has been exceeded. This is due to the fact that it is known that such a write access request can be processed without incurring the earlier mentioned write-to-write penalty. Accordingly, in that instance, the decoded access request is merely added to the relevant buffer 36.

Whilst in the above example the control data 220 may merely comprise a fullness threshold to dictate when the access request evaluation circuitry is enabled and when it is disabled, in other embodiments the control data can also include other additional criteria. For example, each access request may be accompanied by certain sideband information, such as a quality of service (QoS) indication. It may be desirable that even in situations where the buffers 36 are relatively full, if an access request has a particularly high QoS value associated with it, it should still be accepted. Accordingly, such QoS threshold information can also be specified within the control data, such that if an access request is presented with a relatively high QoS value, then it may be determined that even if the fullness threshold is exceeded, the access request evaluation circuitry should still be disabled, such that that access request is merely added to the pending access request buffers 36 once it has been decoded, without any further evaluation being performed by the accept determination circuitry 210. This ensures in that instance that even if the access request would have failed the criteria for being accepted, it is nonetheless accepted and added to the buffers 36.

As one mechanism for ensuring that rejected access requests are not continually rejected when they are retried, in one embodiment the QoS value associated with a re-issued access request can be increased each time it is re-issued, such that at some point the access request evaluation circuitry will effectively be disabled for that retried access request, allowing it to be added to the access requests buffers 36.

Figure 4:
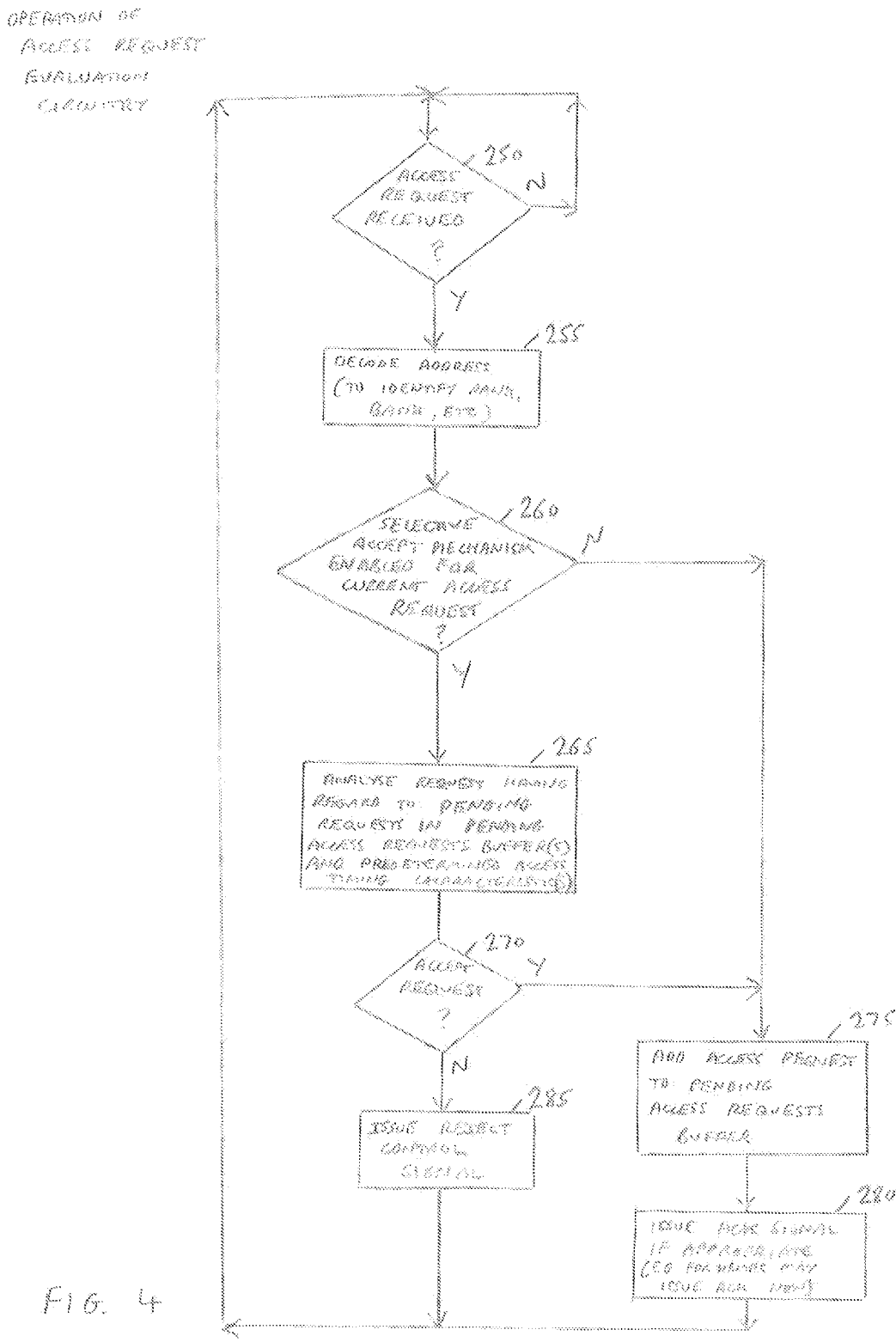
FIG. 4 is a flow diagram illustrating the operation of the access request evaluation circuitry of FIG. 3 in accordance with one embodiment.

FIG. 4 is a flow diagram illustrating the operation of the access request evaluation circuitry of FIG. 3 in accordance with one embodiment. At step 250, it is determined whether an access request has been received, and if so at step 255 the address of that access request is decoded in order to identify the rank, bank etc, being referred to by the access request.

At step 260, it is then determined whether the selective accept mechanism is to be enabled for the current access request, as discussed earlier this being done with reference to the control data 220. It will be appreciated that in one embodiment this determination can be performed in parallel with the address decode operation.

If the selective accept mechanism is not to be enabled, i.e. the access request evaluation circuitry is treated as being disabled, then the decoded access request is merely added to the relevant pending access requests buffer 36 at step 275, whereafter an acknowledgement signal may be issued from the memory controller back to the relevant requesting device if appropriate. For example, it may be the case in one embodiment that write access requests are acknowledged as soon as they are added to the buffers 36. In contrast, for a read access request it may be determined not to the issue the acknowledgement until the read data has been obtained from the memory device.

If it is determined at step 260 that this selective accept mechanism is enabled for the current access request, i.e. the access request evaluation circuitry is determined to be enabled, then at step 265 the accept determination circuitry 210 analyses the current access request having regard to pending access requests in the buffers 36 and one or more predetermined access timing characteristics. As mentioned earlier, the predetermined access timing characteristic can take a variety of forms, but is in one embodiment assessed by comparing one or more attributes of the currently received access request with corresponding attributes of the access requests already stored in the buffers 36. Hence, where the access timing characteristic being considered takes the form of a write-to-write access penalty or a read-to-read access penalty associated with consecutives writes or reads to different ranks, then the rank associated with the currently received access request may be compared with the rank associated with the relevant access requests in the buffers 36 in order to seek to identify situations where such penalties might be incurred. As discussed earlier, this could for example occur where a current access request is seeking to access a rank that is not going to be accessed by any of the other similar access requests in the buffers 36 (for a write access request, the write access requests already in the buffer being considered, whilst for a read access request the read access requests already in the buffer being considered).

As another example, the attribute that is considered may be the row being accessed, to take account of the access timing characteristic associated with accessing different rows within the same bank. If the current access request is seeking to access a row within a particular bank that is different to rows that need to be accessed for that particular bank by pending access requests already in the buffer, then it may be decided to reject the access request so as to avoid the access timing penalty associated with activating a new row within that particular bank.

As a yet further example, it may be the case that certain types of access requests such as refreshes, or self-refreshes, can take a relatively long time to perform. Whilst such an access request is being performed, it may not be possible to perform any other access requests to the same sub-structure, for example a rank within the memory device. Accordingly, in such instances the accept determination circuitry 210 may look at the rank that the current received access request is seeking to access, and if that is the same rank as one of these relatively long access time requests that has already been accepted into the pending access requests buffers 36, it may decide to reject the current access request. Such a rejection may occur whilst the relatively long access time request is pending within the buffers 36, or whilst that request is currently in the process of being performed by the memory device but not yet completed (for this latter case such an request still being considered to be a pending access request).

Based on the analysis performed at step 265, it is then determined at step 270 whether the request should be accepted or not. If it is to be accepted, then the process proceeds to step 275, where the access request is then added to the relevant pending access requests buffer. However, if the access request is not accepted, then a reject control signal is issued at step 285. As mentioned earlier, this reject control signal may include certain additional information, such as particular attribute information associated with the rejected access request. This attribute information is then used to sort the rejected access requests back at the requesting device, so that in one embodiment the requesting device can readily respond to a retry command issued by the memory controller specifying such attribute information. Such a process will be described later with reference to FIG. 5A and the following figures.

By the above described mechanism, it will be appreciated that during periods of high demand, the access request evaluation circuitry 34 can be enabled to allow the memory controller to be more selective about the access requests that are accepted into the buffers 36. By making the accept/reject decisions taking into account at least one access timing characteristic of the memory device, this can enable the buffers 36 to be provided with a more optimal mix of access requests from which the scheduler 38 can then schedule accesses to the memory device, to thereby improve the performance of the memory device.

There are a number of ways in which the requesting devices can handle rejected access requests. For example, they may merely be arranged to periodically retry the rejected access requests, optionally with the increased QoS values discussed earlier. However, additionally, or as an alternative, in one embodiment the memory controller may directly be provided with functionality to review the rejected access requests and to positively issue retry commands to the requesting devices when it is considered appropriate for the rejected access requests to be retried. Such an embodiment will be discussed further with reference to FIG. 5A.

As shown in FIG. 5A, the access request evaluation circuitry 34 operates as described earlier with reference to FIG. 3, resulting in certain access requests being added to the pending access request buffers 36, and certain access requests being rejected. ID allocator circuitry 300 within the access request evaluation circuitry 30 is arranged to add an identifier in association with each rejected access request, so that the reject control signal returned to the requesting device includes that identifier information, in addition, a history of rejected access requests 310 is maintained in a storage accessible to the access request evaluation circuitry 34, the access request evaluation circuitry adding an entry to that history 310 each time an access request is rejected. That entry will include information about the identifier added to the associated reject control signal. In one embodiment, the history may also include an indication of which requesting device issued the rejected access request.

Retry control circuitry 320 is then provided within the memory controller which has access to both the history 310 of rejected access requests, and the current contents of the buffers 36. Whilst in one embodiment the retry control circuitry may be permanently enabled, in another embodiment it can be enabled or disabled based on control data, in much the same way as the access request evaluation circuitry 34 is enabled or disabled. Accordingly, the retry control circuitry could be enabled or disabled based on some fullness criteria associated with the buffers 36. When enabled, the retry control circuitry is arranged to analyse at least one attribute of access requests in the pending access requests buffers 36 in order to apply predetermined retry criteria to take account of at least one access timing characteristic of the memory device. As a particular example, it may hence consider the particular sub-structures associated with the access requests in the buffers 36, such as which ranks are to be accessed. For example, the access request evaluation circuitry may have previously rejected an access request to a particular rank, for example due to the access request evaluation circuitry being enabled at the time that access request was originally received, and it being determined with reference to the contents of the buffers 36 that an access request to that rank should not be added to the butler at that time, taking into account the access timing characteristic(s) being considered. However, over time the contents of the pending access requests buffers will change. By way of a specific example, the level of fullness of the buffers may have dropped to a point where the access request evaluation circuitry was disabled, and a number of access requests to rank X may then have been added to the pending access requests buffers. At that point, it may actually be beneficial if the rejected access request to rank X is now retried, in order to increase the number of access requests within the pending access requests buffers seeking to access rank X.

Hence, the retry control circuitry 320 will evaluate the contents of the buffers 36 and the history of rejected access requests 310, in order to seek to determine an appropriate point in time to ask each rejected access request to be retried. A retry command is then issued to the appropriate requesting device, that retry command in one embodiment being accompanied by the same identifier field that was used in the original reject signal issued from the access request evaluation circuitry. This can enable the requesting device to identify appropriate access request to retry.

In particular, in one embodiment each requesting device may keep records of the rejected access requests on a per identifier field basis, as illustrated schematically in FIG. 5B.

As shown in FIG. 5B, selection circuitry 355 within the requesting device 350 selects access requests to be issued to the memory controller over path 357. In some instances there may be multiple candidate access requests from which the selection circuitry can choose, and any suitable policy can be applied to select between those candidate access requests, such as for example looking at the relative QoS values of those requests. As each request is issued over path 357, it is added to the outstanding issued access requests record 360. When an acknowledgement for an access request is subsequently received over path 362 from the memory controller, then in one embodiment the relevant access request can be removed from the outstanding issued access requests record 360. In one embodiment, for a write access request the acknowledgement signal is issued as soon as the write access request is accepted into the pending write buffer 36. However, an acknowledgement for a read access request is only provided when the read data is returned to the requesting device.

However, as discussed earlier, not all access requests will be accepted into the buffers 36, and instead some may be rejected, resulting in a reject signal being issued over path 364, along with an associated identifier field. On receipt of a reject signal, the relevant access request is moved from the record 360 into the record 370, which maintains on a per identifier field basis individual records 372, 374, 376 of rejected access requests. Hence, an identifier for a rejected access request is stored in the relevant sub-record 372, 374, 376, also referred to herein as buckets.

When in due course a retry command is issued over path 380 to the requesting device 350, it is received by the selection circuitry 355. Based on the identifier field specified in the retry command, the selection circuitry accesses the relevant bucket within the rejected requests storage 370, and in particular selects one of the rejected access requests in that bucket to be retried. It then issues that access request as a retried access request over path 357, at which point an indication of that access request is added to the outstanding issued access requests record 360, and the relevant access request is removed from the relevant bucket of the rejected requests storage 370.

As discussed earlier with reference to FIG. 5A, in one embodiment the history 310 also maintains an indication of which requesting device issued any particular rejected access request. Accordingly, the retry command issued by the memory controller can be targeted at a particular requesting device. However, in an alternative embodiment, the history 310 may not maintain that information, and instead the retry commands may be broadcast to all of the requesting devices. Again, the retry commands will have an associated identifier field specified, and hence each of the requesting devices can look in their per identifier field rejected requests storage 370 in order to identify whether they have an appropriate access request to retry. This may result in multiple requests being retried that meet the requirements specified in the retry command by the identifier field, and those multiple requests may all be accepted, or some of them may be rejected, dependent on the operation of the access request evaluation circuitry as each access request is considered in turn.

In one embodiment, the retry control circuitry 320 is always enabled, so that it can always be looking for opportunities where it may be appropriate to retry particular rejected access requests. It should be noted that such opportunities may not only arise when the pending access request buffers are relatively empty, but could even arise when they are relatively full. For example, there may be instances where the buffers are relatively full, but it would be particularly advantageous to receive access requests of a particular type, and at least one of the rejected access requests is of that type. In this instance, the retry control circuitry can issue a relevant retry command in order to cause that access request to be retried.

However, in an alternative embodiment, control data is associated with the retry control circuitry 320 to determine when the retry control circuitry is enabled or disabled. In one particular embodiment, a fullness threshold can again be specified in a similar way to the fullness threshold associated with the access request evaluation circuitry. However, in one embodiment, the retry control circuitry will be enabled when the fullness of the buffers 36 is below that threshold, and will be disabled when it is above that threshold.

Figure 6:
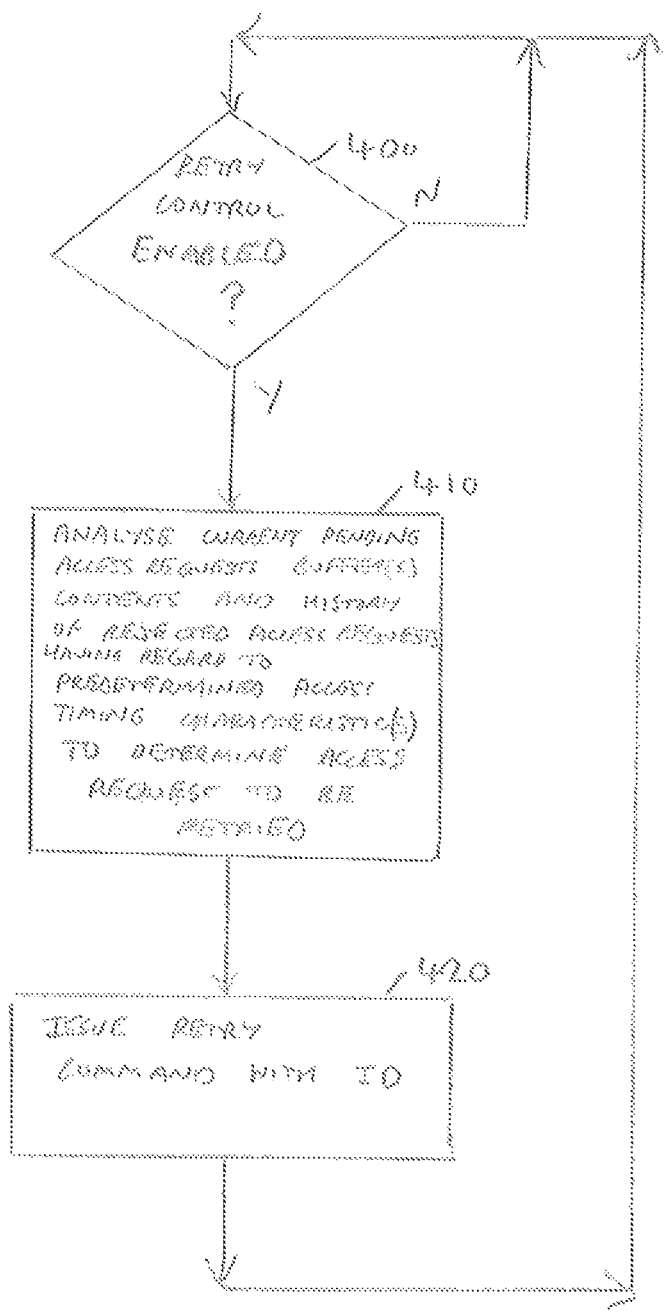
FIG. 6 is a flow diagram illustrating the operation of the retry control circuitry of FIG. 5A in accordance with one embodiment.

FIG. 6 is a flow diagram illustrating the operation of the retry control circuitry. At step 400, it is determined whether the retry control circuitry is enabled. As discussed earlier, it may be the case that the retry control circuitry is always enabled in some embodiments, whilst in others it may be decided to only enable the retry control circuitry in certain situations, for example when the buffers 36 are below some specified fullness threshold.

Assuming the retry control circuitry is enabled, then at step 410 the contents of the pending access requests buffers 36 are analysed, along with the history of rejected access requests, having regards to one or more predetermined access timing characteristics. In particular, as discussed earlier, the retry control circuitry seeks to determine, based on the current mix of access requests in the buffers 36, whether there are any rejected access requests that it would now be an opportune time to retry.

Once such a rejected access request has been detected, then a retry command is issued at step 420, along with an associated identifier indicating a desired attribute of that access request. As discussed earlier, this may be some decoded part of the address, such as an indication of the rank that is being accessed. Alternatively, it could take the form of some other attribute, such as a quality of service attribute. In any event, in one embodiment the identifier field is of the same form as the identifier field used in the reject signals previously issued by the access request evaluation circuitry for any rejected access requests, and as discussed earlier with reference to FIG. 5B the contents of that identifier field are used to identify the relevant bucket 372, 374, 376 within the rejected requests storage 370 that rejected access requests are stored in. That identifier field within the retry command is hence used to cause the relevant bucket to be accessed in order to identify a suitable access request to be retried. Following step 420, the process returns to step 400.

In one embodiment, the retry control circuitry can also take account of other factors when deciding which rejected access requests should be retried. For example, it will be understood that various conflicts may exist between pending access requests in the buffers 36 which are detected by hazard detection logic, and which may mean that certain of the access requests in the buffers 36 cannot currently be issued. Accordingly, the retry control circuitry can additionally take account of all of the relevant hazard information, and hence a knowledge of which requests within the buffer can currently be scheduled and which cannot, when reviewing the rejected access requests in order to determine appropriate access requests to retry.

In one embodiment, it is also possible that the same identifier information may not be used for rejected write access requests and rejected read access requests. For example, the identifier field for write access requests that are rejected may specify certain address decode information, such as the rank being accessed, whilst the relevant identifier information used for read accesses may be entirely different, for example a QoS value associated with the rejected read access request. Within the requesting device, separate rejected requests storage buckets may be provided for write access requests and read access requests, enabling write access requests that have been rejected to be sorted by certain identifier information, whilst read requests are sorted by different identifier information.

FIG. 7 is a flow diagram illustrating the operation of the requesting device 350 shown in FIG. 5B in one embodiment. At step 450, the selection circuitry 355 determines whether there is at least one candidate access request or retry command waiting to be processed. If not, no requests are issued. However, assuming there is at least one candidate access request or a retry command to be processed, then at step 455 it is determined whether a retry command is currently asserted over path 380. If not, then the process proceeds to step 460 where predetermined criteria are applied to select the access request to be issued over path 357 as the next access request. Such criteria only needs to be applied if there is more than one candidate access request currently being presented to the selection circuitry 355.

At step 465, the selected request is issued as the next issued access request over path 357, and an indication of that selected request is added at step 470 to the outstanding issued access requests record 360. Thereafter the process returns to step 450.

However, in the embodiment shown in FIG. 7, it is assumed that a retry command takes priority over any candidate access requests, and accordingly in the presence of a retry command at step 455, the process proceeds to step 475, where the identifier information in the retry command is used to identify a particular bucket 372, 374, 376 within the requests storage 370. Then, a request is selected from the appropriate bucket in the rejected requests storage. Thereafter, at step 480, that selected request is then issued as the next access request over path 357, and at step 485 an indication of the selected request is removed from the relevant bucket of the rejected requests storage 370 and an indication of that access request is instead added to the outstanding issued access requests record 360. Thereafter the process returns to step 450.

In the embodiment illustrated in FIG. 7, it is assumed that any retry command is targeted at a particular requesting device, based on the history 310 maintained within the memory controller identifying not only the identifier field information associated with rejected access requests, but also the requesting device that issued each rejected access request. Accordingly, it is known that at step 475 there will be a rejected access request to select. If in an alternative embodiment the retry requests were merely broadcast to all of the requesting devices, it will be appreciated that each of the requesting devices will perform the process shown in FIG. 7, and for some retry commands it may be that one or more requesting devices do not have any suitable rejected requests to be resent. In that event, any such requesting device can merely discard the retry command and continue with normal processing.

It will be appreciated that the above described embodiments allow a memory controller to selectively evaluate incoming requests, so as to enable selectivity as to which access requests are accepted into the buffers 36, with the aim of providing the scheduler 38 with a better mix of requests from which to schedule accesses to the memory device, thereby improving performance.

If one very specific example is considered for illustration, as mentioned earlier there is a write-to-write penalty incurred when issuing two consecutive write accesses to different ranks. If for ease of illustration a very simple scenario is envisaged where the pending write buffer within the memory controller can store eight write access requests, then if the pending write buffer were filled up with eight write access requests that were all to different ranks, there would be seven write-to-write timing penalties incurred when issuing those eight write access requests. This leads to suboptimal use of the write data bus, decreasing DRAM bandwidth.

However, when using the above-described embodiment, and in particular the access request evaluation circuitry functionality, in periods where the memory controller is a performance bottleneck, due for example to more requests being presented to the memory controller than can currently be processed, the access request evaluation circuitry can be used to ensure that the memory controller does not fill up with such a sub-optimum mix of write access requests. If for example the fullness threshold is set to indicate when the pending write buffer is half full, then as soon as four write access requests have been added to the pending write buffer, the selective functionality of the access request evaluation circuitry will be enabled. In one particular embodiment, that access request evaluation circuitry may determine for a current write access request under consideration, whether that write access request is seeking to access a rank that is not already associated with one of the pending write access requests in the pending write buffer. If it is in fact seeking to write to a different rank not associated with one of the pending write access requests already in the buffer, then it may be arranged to reject that access request. Conversely, if a current write access request is seeking to access a rank that is already associated with one of the write access requests already in the buffer, then it may accept that write access request. In accordance with such an approach, it will be appreciated that if all eight entries in the buffer were filled, they would at a maximum involve writes being performed in respect of only four ranks, and accordingly the scheduler could schedule those accesses so that only three write-to-write penalties are incurred.

If for the sake of example it is assumed that a write-to-write penalty is two cycles, then the earlier mentioned scenario that did not incorporate the access request evaluation technique of the described embodiments would have 14 (7×2) dead cycles, whilst when adopting the above described techniques this would reduce to 6 (3×2) dead cycles. It will be appreciated that this is a significant performance improvement.

It will be appreciated that the above example is merely for the purposes of illustration, and most memory controller pending access requests buffers allow for more than eight entries. Also there are systems available today with more than eight ranks. Irrespective of the sizes of the various pending access requests buffers, and the number of ranks provided in the memory device, the principles described above still apply.

For example, the techniques described herein may be usefully employed in memory controllers used in mobile devices, where the queue sizes are relatively small. In addition, the techniques could also be usefully employed in enterprise systems, where the queues are typically larger, but the number of ranks in the memory device may also be much greater than in a typical mobile device.

Further, whilst in the specific example discussed it is assumed that the memory device is DRAM memory, it will be appreciated that the techniques are not limited to DRAM memory, and instead can be applied to any form of memory device having sub-structures that give rise to non-uniform access timing characteristics, for example Correlated Electron Random Access Memory (CeRAM), Ferroelectric RAM (FeRAM), etc.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A memory controller for controlling access to a memory device, comprising:
    a pending access requests storage to store access requests to be issued to the memory device;
    memory access control circuitry to issue to the memory device access requests selected from the pending access requests storage;
    an interface to receive access requests from at least one requesting device; and
    access request evaluation circuitry to apply evaluation criteria to determine, for a current access request received by said interface, whether to accept that current access request, the evaluation criteria taking account of at least one access timing characteristic of the memory device;
    wherein:
    the access request evaluation circuitry is responsive to determining that the current access request is to be accepted, to cause that current access request to be stored in the pending access requests storage; and
    the access request evaluation circuitry is responsive to determining from application of the evaluation criteria that the current access request is to be rejected instead of accepted, to prevent that current access request being added to the pending access requests storage and to cause a rejection indication to be issued to the requesting device that issued that current access request;
    the memory controller further comprising:
    retry control circuitry to apply retry criteria to determine whether to issue to a requesting device a retry request, in order to cause said requesting device to re-issue to the memory controller an access request that has previously been rejected, the retry criteria taking account of at least one access timing characteristic of the memory device.

2. A memory controller as claimed in claim 1, wherein:
    the access request evaluation circuitry is arranged to compare at least one attribute of the current access request with at least one attribute of access requests in the pending access requests storage when applying the evaluation criteria to take account of said at least one access timing characteristic of the memory device.

3. A memory controller as claimed in claim 2, wherein the memory device comprises a plurality of regions, and said at least one attribute comprises a region attribute identifying a region of the memory device to be accessed by the access request.

4. A memory controller as claimed in claim 3, wherein said at least one access timing characteristic of the memory device comprises a data access timing penalty incurred when the memory access control circuitry issues access requests to the memory device that identify different regions.

5. A memory controller as claimed in claim 4, wherein the access request evaluation circuitry is arranged to determine that the current access request is to be rejected when it is determined that the addition of the current access request to the pending access requests storage could give rise to said data access timing penalty being incurred when that current access request is subsequently issued to the memory device, having regard to the access requests already stored in the pending access requests storage.

6. A memory controller as claimed in claim 4, wherein the plurality of regions comprise a plurality of ranks.

7. A memory controller as claimed in claim 6, wherein the data access timing penalty is incurred when the memory access control circuitry issues consecutive write access requests to different ranks within the memory device.

8. A memory controller as claimed in claim 4, wherein the plurality of regions comprise a plurality of rows within a bank of the memory device, and the data access timing penalty is incurred when the memory access control circuitry issues access requests to different rows within the same bank of the memory device.

9. A memory controller as claimed in claim 3, wherein said at least one access timing characteristic of the memory device comprises an access time period associated with a particular type of access request already stored in the pending access requests storage.

10. A memory controller as claimed in claim 9, wherein the access request evaluation circuitry is arranged to determine that the current access request is to be rejected when it is determined that the current access request is seeking to access a region that is the same as the region to be accessed by said particular type of access request already stored in the pending access requests storage.

11. A memory controller as claimed in claim 10, wherein the current access request is rejected when the particular type of access request already stored in the pending access requests storage has been issued by the memory access control circuitry to the memory device, but the memory device has not yet completed processing of that access request.

12. A memory controller as claimed in claim 1, further comprising:
control storage to store control data used to determine whether the access request evaluation circuitry is enabled for the current access request, when the access request evaluation circuitry is disabled the current access request being accepted and stored within the pending access requests storage.

13. A memory controller as claimed in claim 12, wherein the control data identifies at least a fullness threshold of the pending access requests storage, and the access request evaluation circuitry is disabled for the current access request if the number of access requests already stored in the pending access requests storage does not exceed said fullness threshold.

14. A memory controller as claimed in claim 13, wherein the control data additionally identifies one or more additional evaluation criteria to be evaluated when determining whether the access request evaluation circuitry is enabled for the current access request.

15. A memory controller as claimed in claim 1, wherein:
the retry control circuitry is arranged to analyse at least one attribute of access requests in the pending access requests storage when applying the retry criteria to take account of said at least one access timing characteristic of the memory device.

16. A memory controller as claimed in claim 15, further comprising:
a rejected access requests storage to maintain predetermined information about access requests that have previously been rejected, said predetermined information comprising at least said at least one attribute that is analysed by the retry control circuitry for the access requests in the pending access requests storage.

17. A memory controller as claimed in claim 16, wherein the retry control circuitry is arranged to determine, from the analysis of said at least one attribute of access requests in the pending access requests storage, a value of said at least one attribute desired for a re-issued access request, and is arranged to reference the rejected access requests storage to determine whether the access requests that have been previously rejected include an access request having that value for said at least one attribute.

18. A memory controller as claimed in claim 1, wherein said retry request includes an identifier field identifying at least one attribute required for the access request to be re-issued.

19. A memory controller as claimed in claim 18, wherein said rejection indication issued by the access request evaluation circuitry when an access request is rejected also includes said identifier field, allowing said at least one requesting device to maintain a record of its access requests that have been rejected, sorted by said at least one attribute.

20. A memory controller as claimed in claim 1, wherein the retry request is issued to a selected requesting device from said at least one requesting device.

21. A memory controller as claimed in claim 1, wherein the retry request is broadcast to all of said at least one requesting devices.

22. A memory controller as claimed in claim 1, further comprising:
retry control storage to store retry control data used to determine when the retry control circuitry is enabled and when the retry control circuitry is disabled.

23. A memory controller as claimed in claim 22, wherein the retry control data identifies at least a fullness threshold of the pending access requests storage, and the retry control circuitry is disabled if the number of access requests already stored in the pending access requests storage exceeds said fullness threshold.

24. A memory controller as claimed in claim 1, wherein said evaluation criteria applied by the access request evaluation circuitry is predetermined evaluation criteria.

25. A method of operating a memory controller to control access to a memory device, comprising:
storing, in a pending access requests storage, access requests to be issued to the memory device;
issuing to the memory device access requests selected from the pending access requests storage;
receiving access requests from at least one requesting device;
applying evaluation criteria to determine, for a current access request received, whether to accept that current access request, the evaluation criteria taking account of at least one access timing characteristic of the memory device;
responsive to determining that the current access request is to be accepted, storing that current access request in the pending access requests storage;
responsive to determining from application of the evaluation criteria that the current access request is to be rejected instead of accepted, to prevent that current access request being added to the pending access requests storage and to cause a rejection indication to be issued to the requesting device that issued that current access request; and
employing retry control circuitry within the memory controller to apply retry criteria to determine whether to issue to a requesting device a retry request, in order to cause said requesting device to re-issue to the memory controller an access request that has previously been rejected, the retry criteria taking account of at least one access timing characteristic of the memory device.

26. A memory controller comprising:
access request evaluation circuitry to apply evaluation criteria to determine, for a current access request received by an interface, whether to accept that current access request, the evaluation criteria taking account of at least one access timing characteristic of a memory device;
the access request evaluation circuitry being responsive to determining that the current access request is to be accepted, to cause that current access request to be stored in a pending access requests storage;

the access request evaluation circuitry being responsive to determining from application of the evaluation criteria that the current access request is to be rejected instead of accepted, to prevent that current access request being added to the pending access requests storage and to cause a rejection indication to be issued to a requesting device that issued that current access request;

the memory controller further comprising:

retry control circuitry to apply retry criteria to determine whether to issue to a requesting device a retry request, in order to cause said requesting device to re-issue to the memory controller an access request that has previously been rejected, the retry criteria taking account of at least one access timing characteristic of the memory device.

27. A requesting device for communicating with an memory controller for controlling access to a memory device, where the memory controller includes:

a pending access requests storage to store access requests to be issued to the memory device;

memory access control circuitry to issue to the memory device access requests selected from the pending access requests storage;

an interface to receive access requests from at least one requesting device; and access request evaluation circuitry to apply evaluation criteria to determine, for a current access request received by said interface, whether to accept that current access request, the evaluation criteria taking account of at least one access timing characteristic of the memory device;

wherein the access request evaluation circuitry is responsive to determining that the current access request is to be accepted, to cause that current access request to be stored in the pending access requests storage; and wherein the access request evaluation circuitry is responsive to determining from application of the evaluation criteria that the current access request is to be rejected instead of accepted, to prevent that current access request being added to the pending access requests storage and to cause a rejection indication to be issued to the requesting device that issued that current access request;

the memory controller further comprising retry control circuitry to apply retry criteria to determine whether to issue to a requesting device a retry request, in order to cause said requesting device to re-issue to the memory controller an access request that has previously been rejected, the retry criteria taking account of at least one access timing characteristic of the memory device, wherein said retry request includes an identifier field identifying at least one attribute required for the access request to be re-issued, and wherein said rejection indication issued by the access request evaluation circuitry when an access request is rejected also includes said identifier field, allowing said at least one requesting device to maintain a record of its access requests that have been rejected, sorted by said at least one attribute, the requesting device comprising:

a rejected requests storage comprising a plurality of storage portions, each storage portion associated with at least one attribute specifiable in said identifier field; and control circuitry to store an indication of a rejected access request within the storage portion associated with the at least one attribute specified in the identifier field of said rejection indication, and further responsive to a retry request to determine the at least one attribute specified in the identifier field of the retry request and to determine from the associated storage portion a rejected access request to reissue.

* * * * *